Sept. 21, 1971 S. AUSNIT Re. 27,174

RECLOSABLE BAGS WITH RIB AND GROOVE ELEMENTS
FORMED OF DIFFERENT MATERIALS
Original Filed Oct. 22, 1965

INVENTOR.
STEVEN AUSNIT

BY Hill, Sherman, Meroni, Gross & Simpson ATTORNEYS

United States Patent Office

Re. 27,174
Reissued Sept. 21, 1971

27,174

RECLOSABLE BAGS WITH RIB AND GROOVE ELEMENTS FORMED OF DIFFERENT MATERIALS

Steven Ausnit, 124 E. 61st St., New York, N.Y. 10021

Original No. 3,371,696, dated Mar. 5, 1968, Ser. No. 500,652, Oct. 22, 1965. Application for reissue Jan. 23, 1970, Ser. No. 5,293

Int. Cl. B65d *33/24*

U.S. Cl. 150—3 10 Claims

Matter enclosed in heavy brackets [ ] appears in the original patent but forms no part of this reissue specification; matter printed in italics indicates the additions made by reissue.

*ABSTRACT OF THE DISCLOSURE*

*A sheet with an integral flexible closure including a plastic film with raised integral rib and groove elements thereon shaped for releasably interlockingly joining each other and the plastic film formed of a thermoplastic having a first physical property and the rib and groove elements formed of a thermoplastic having a second different physical property.*

This invention relates to resilient type fasteners for closing and sealing a pouch or other container and, in particular, to a flexible closure strip having an elongated bead formed thereon for improving the accessibility of grip flanges used in opening the resilient fastener.

New developments in resilient type fasteners and in containers formed of thermoplastic substances have made flexible closure elements inexpensive, efficient and desirable for an increasing number of uses. One such developments has been an improved ability to extrude a thermoplastic substance in the form of a film having a greatly reduced thickness, and an associated development has been in discovering an improved means for attaching a flexible closure strip to the thin film edge, at the time the film is made. The result has been significantly reduced cost of construction and improved adaptability to new applications.

Flexible closure strips of the type concerned herein are provided to be opened by separating grip flanges which extend above the fastener elements. However, due to the thinness of the film and the nature of the thermoplastic substance, the grip flanges tend to adhere to each other with the result that the point of opening is somewhat indistinguishable and somewhat inaccessible.

Therefore, it is an object of this invention to provide a means for readily distinguishing grip flanges formed at a pouch or container opening above interlocking rib and groove elements of a resilient type fastener.

Another object of this invention is to provide a flexible closure strip for use with a pouch or similar container which has first and second grip flanges of different lengths and which has a raised surface formed longitudinally along the upper extremity of the shorter grip flange, in order to make the grip flanges easily separable.

It is also an object of this invention to provide a flexible closure strip for use with a pouch or container which has a resilient bead formed longitudinally at the upper extremity of a grip flange used for opening interlocking elements of the closure assembly.

It is a further object of this invention to provide a resilient type fastener for closing a pouch or similar container which has a resilient bead formed at the outer surface and at the upper extremity of a grip flange used for opening the interlocking elements of the fastener assembly.

It is another object of this invention to provide a flexible closure strip for use with a pouch or similar container which is constructed of a first thermoplastic substance and which has a resilient bead formed at the upper extremity of one of two grip flanges used for opening the interlocking fastening assembly and which bead is constructed of a second thermoplastic substance.

It is yet another object of this invention to provide a flexible closure strip having raised elements formed thereon which are utilized in opening and closing the fastening assembly and which are constructed of a thermoplastic substance having distinct qualities from the thermoplastic substance used to form the closure strip and the pouch or associated container.

It is an additional object of this invention to provide a method for forming a raised member of a flexible closure strip of a first thermoplastic substance and to construct the closure strip and associated pouch or container of a second thermoplastic substance.

It is also an object of this invention to provide methods for accomplishing each of the above identified flexible closure strip structures.

It is another object of this invention to provide a device for developing a raised member of a resilient type fastener which is formed integrally with the fastener closure strips and which is formed of a thermoplastic substance having distinct qualities therefrom.

It is also an object of this invention to provide a device for forming interlocking rib and groove elements of a first thermoplastic substance directly on and integrally with a film constructed of a second thermoplastic substance.

It is a further object of this invention to provide a device for developing each of the above identified resilient type fastener structure.

These and other objects, features and advantages of the present invention will be understood in greater detail from the following description and associated drawings wherein reference numerals are utilized in designating a preferred embodiment and wherein.

A "flexible closure strip" in this application means a closure assembly which includes the interlocking closure elements, grip flanges and, in this case, a spacer or marker bead. The flexible closure strip per se may be formed separately and attached integrally to the body of the pouch or associated container, or, in the alternative, the flexible closure strip may be an integral portion of a continuous thermoplastic film which when slit and shaped will comprise a pouch or container having the indicated fastener elements disposed at the opening thereof.

Providing a flexible closure strip, in effect, means providing raised elements on a thin continuous film surface. While the raised elements are usually formed integrally with the supporting film structure, it has become highly desirable to construct the raised elements of a thermoplastic substance having different qualities from that of the supporting film, though still integral therewith.

For instance, the raised elements and the supporting film may have a distinct and a different melt index or may involve specialized slip qualities. In addition, the gel of the raised elements may be desirably distinguishable from those of the film structure. As used in this context, melt index refers to the flow quality of the thermoplastic substance when subjected to a given force at a given temperature. The slip quality refers to the lubricity of the thermoplastic substance and is important to the extrudability characteristic. Gel is an indirect reference to the rigidity of the thermoplastic substance; gel also affects the clarity of the thermoplastic material.

It is apparent, therefore, that to accomplish different desirable objectives of both the film and raised element features of a flexible closure strip, means must be provided to form raised elements and film supporting structures which have different qualities and which are formed integrally.

Figure 2:
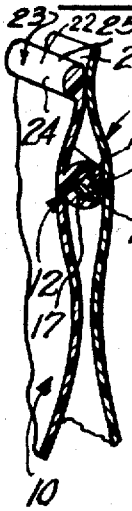
FIG. 2 is a partially sectioned isometric view similar to that shown in FIG. 1 for illustrating a different positioning of the raised bead provided at the upper extremity of the grip flange.
Figure 1:
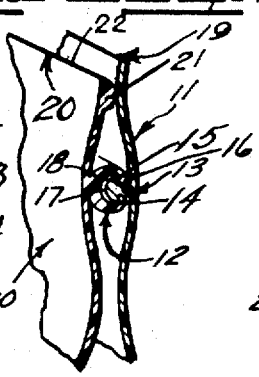
FIG. 1 is an isometric partially sectioned view showing a flexible closure strip and the associated interlocking elements and illustrating the positioning of a spacer bead formed at the upper extremity of a grip flange.

An example of the novel structure of this invention is shown generally in FIGS. 1 and 2 wherein a raised bead is provided at grip flange for improving the accessibility of the pouch opening. In FIG. 1 the flexible closure strips 10 and 11 are provided with interlocking rib and groove elements 12 and 13 formed at the inner surface thereof. In standard manner, the rib element 13 is provided with overhanging ridges 14 and 15 which will readily deform upon a pressure applied inwardly of the closure strips 10 and 11. This deformation occurs at the restricted groove opening 16 of the groove element 12. Once the rib element penetrates the opening 16 and is received within an enlarged cavity 17, the deformed member assumes its unrestrained configuration and becomes locked therein at undercut engaging surfaces 18.

The interlocking rib and groove elements may be reopened or unlocked by the provision of upwardly extending grip flanges 19 and 20. By urging the flanges 19 and 20 outwardly of the pouch enclosure, the rib and groove elements may be peeled from the locked position shown in FIG. 1. This unlocking function occurs due to the direction in which the resulting force from the grip flanges is directed to the respective rib and groove elements.

However, it can be appreciated that due to the comparatively thin thermoplastic substance used for making the flanges 19 and 20, and also due to the adhesive nature of of smooth surfaces and in particular of thermoplastic surfaces, the demarcation between the flanges 19 and 20, which must be grasped for opening the fastener elements, can be indistinguishable either to the sight or touch. To avoid this consequence, one of the flanges 19 or 20 may extend above the opposing flange for the purpose of emphasizing the point of opening. This remedy, however, has not been entirely successful, and this invention employs a specialized resilient bead 21 longitudinally at the upper extremity of the grip flange 20 for improving the accessibility of the flanges and hence of the pouch or associated container.

The bead 21 is formed integrally with the flange 20 and has a rounded face 22 which extends inwardly of the associated flanges. This inward extension of the bead 22 holds the opposite flange 19 spaced from the inner surface of the flange 20. Also, the rounded face 22 provides a minimum contact area between the respective flanges for reducing the adhesive effects of the thermoplastic substance.

The size and positioning of the bead 21 at the inner surface of the flange 20 is not arbitrary. For instance, by moving the bead 21 closer to the interlocking rib and groove elements and by providing the rounded surface 22 to be sufficiently elevated from the face of the flange 20, an obstacle may be presented to the locking of the interlocking elements. In particular, the spreading of the flanges either purposely or with the elevated face 22 can reduce the locking qualities of the associated fastener elements.

In contrast, by providing the rounded surface 22 to be insufficiently elevated from the inner face of the grip flange 20 the effectiveness of the spacing function associated with the bead 21 will be greatly reduced. In addition, spacing the bead 21 by a sufficient distance from the region of the interlocking elements reduces the spreading effect and hence eliminates the possibility of accidental and undesirable opening of the pouch. Therefore, the size and positioning of the bead 21 is related to the size and configuration of the interlocking structure to which it pertains.

FIG. 2 shows a flexible closure assembly substantially equivalent to that illustrated in FIG. 1 with the exception that a raised surface in the form of a bead 23 is disposed at the outer surface of the grip flange 20. Unlike the example of FIG. 1, the raised bead of FIG. 2 does not provide a spacer function for spreading the grip flanges 19 and 20. However, the raised bead 23 does provide a function which is identical to a function associated with the raised bead 21 of FIG. 1. That function is that the raised beads 22 and 23 both provide means for improving the accessibility of the grip flanges and of the associated pouch or container.

In FIG. 2 this improved accessibility is achieved from the positioning of the raised bead 23 at the upper extremity of the grip flange 20. In particular, the raised bead 23 is provided with a rounded face 24 which tapers to the upper edge 25 of the flange 20. Also, the opposing grip flange 19 extends above the flange 20 and hence above the raised bead 23 to improve the opening process.

The added accessibility derives from the fact that by placing the thumb at the curved surface 24 and sliding the thumbnail upward, the edge 25 is clearly distinguishable against the inner facing 26 of the grip flange 19. Therefore, the raised surface 24 of the bead 23, together with the upwardly extending portion of the grip flange 19, cooperates to provide a means for gaining ready accessibility to the separate flanges and for opening the associated interlocking fastener elements.

FIGS. 3 through 6 show devices and illustrate methods for developing the raised elements as disclosed in FIGS. 1 and 2 at the surface of the flexible closure strips.

Figure 3:
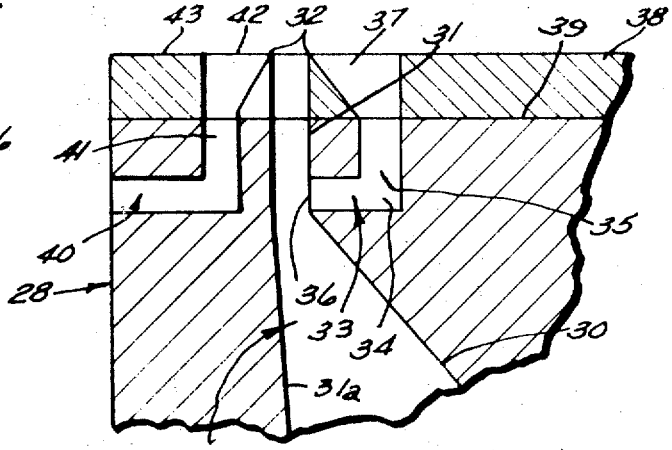
FIG. 3 is a sectional view of a device used for developing the raised members of the flexible closure elements shown in FIGS. 1 and 2.

In FIG. 3 an extruder feeds a die body 28 which is provided with a main flow channel 29 comprising tapered wall portions 30 and straight wall portions 31 and opposing wall portion 31A. The straight wall portions 31 and 31A define an outlet 32 which is used to form the film on the flexible closure supporting structure. The opening 32 at the upper surface of the die body 28 may be, for example, as narrow as .006 of an inch or less, in order to yield a film of a thickness as low as .001.

Assuming in this particular example, that the rib and groove elements as shown in FIGS. 1 and 2 are to be constructed of a thermoplastic substance identical to the thermoplastic material used to form the film structure, the device of FIG. 3 provides a tributary channel 33 consisting of a right angle leg 34 and a parallel passage 35. The right angle passage 34 conducts from an opening 36 formed at the main channel 29 and the parallel passageway 35 conducts to a die opening 37 formed within a die plate 38 which is mounted at the upper surface 39 of the die body 28.

To provide the bead structure as shown in FIG. 2, the die body 28 is provided with a separate and distinct flow channel 40 which conducts from a source another thermoplastic substance having qualities which differentiate from the substance carried through the main channel 29. The thermoplastic substance associated with the separate channel 40 is carried to a vertical leg 41 and to a die opening 42 formed within a die plate 43. The die plate 43, like the plate 38, is mounted securely at the upper surface 39 of the die body 28.

Figure 4:
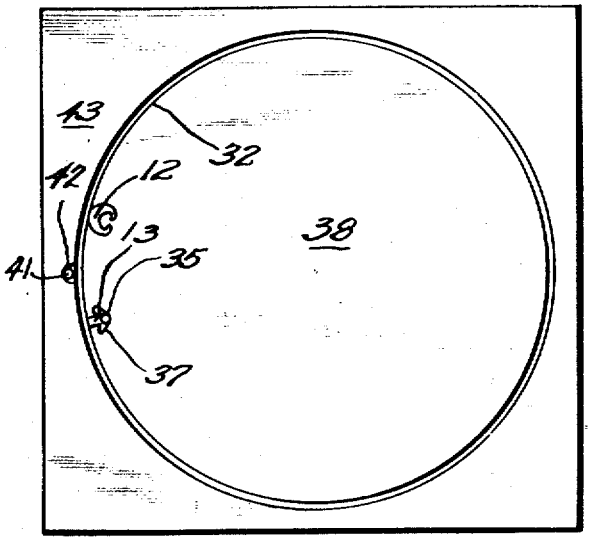
FIG. 4 is a top view of the device shown in FIG. 3 for illustrating the relative positioning of the indicated dies.

In FIG. 4, the top view of the die plates 38 and 43 illustrates the relative positioning of the interlocking die structures and the association of the bead die with that of the main channel 29. It is apparent that the device of FIG. 4 is related to the structure shown in FIG. 2 in that the bead die is formed across the channel 29 opposite the cooperable interlocking member. It is also apparent that the raised members of the fastener structure are formed on the pouch or container film directly which may be extruded through a circular type main channel.

Figure 5:
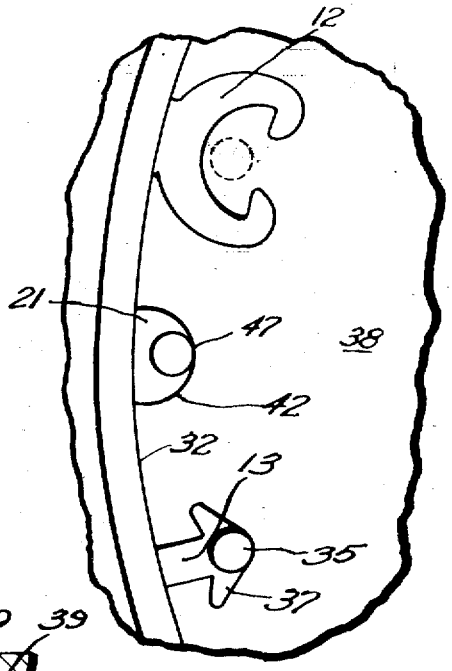
FIG. 5 is a top view of a device similar to that shown in FIG. 4 and having an alternate arrangement of the respective dies.

FIG. 5 is a top view of a device similar to that shown in FIG. 3 which has the bead die formed on the same side of the principal channel 29 as the interlocking rib groove members. This is the device utilized for developing the structure of FIG. 1 wherein the raised bead provides a spacer surface between the associated grip flanges. This is in contrast to the example of FIG. 2 wherein the raised bead provides a thumbnail surface to improve the accessibility of the flange opening.

Figure 6:
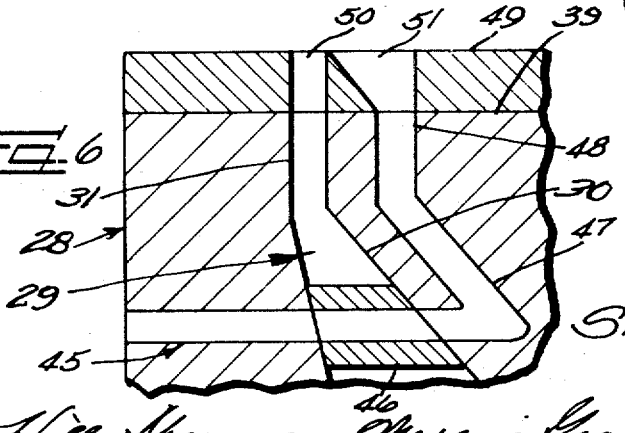
FIG. 6 is a sectioned view of a die having a separate channel for developing the interlocking rib and groove element of a different thermoplastic substance from the sheeting to which it is attached.

In FIG. 6, a die body is shown having features similar to that illustrated in FIG. 3 with the added feature of a means for forming the interlocking rib and groove elements of a thermoplastic substance which has distinctive features which distinguish the similar features of the film structure. In particular, the die body 28 has a separate channel 45 which crosses the main channel within a connector sleeve 46 which connects the central part of the die body to the outer part of the die body. The channel 45 extends through an elongated parallel passage 47 to the vicinity 48 of a die plate 49.

The main channel 29 carries the thermoplastic material, which forms the structural film of the pouch, past and around the connector sleeve or bridge member 46 to the narrow extruder opening 50. Simultaneously, the flow of a second thermoplastic substance through the separate passageway 45 develops the interlocking rib and groove elements within the die 51 and merges with the flow of the first thermoplastic substance at the extruder opening or outlet 50. In this way, the interlocking rib and groove elements can be provided simply and efficiently to have specialized properties distinct from properties of the film structure and which are formed integrally with that structure.

By using separate channels, a resin with sufficient rigidity for greater strength can be directed at the interlocking elements, while a resin with greater clarity for the best optical properties can be directed at the film. Since these properties are usually not found in the same resin, this avoids the necessity of a compromised resin which would have only part of the desired properties for each part of the structure. For example, it has been found that the best suited resin for a profile construction will give a completely milky appearance when applied to a film, making the film relatively opaque.

By using separate channels it is also possible to impart a greater slip factor to the interlocking elements than to the film structure. This is desirable since greater slip makes possible easier opening and closing of the interlocking elements, which slip, if imparted to the film structure, makes the finished pouches produced thereof very slippery and difficult to handle.

Another advantage in separating the interlocking element material from that of the film structure is that of being able to impart (especially when combined with greater slip as mentioned above) a greater stiffness to these elements. This means that the interlocking elements can be made smaller and hence use up less raw material and hence make the whole structure more economical.

Yet another advantage of separating the resin channels is that of being able to give to each resin a different elongation factor. For example, it is desirable for the film structure to stretch more and at a greater speed than the interlocking elements. This is because the interlocking elements are complicated profiles that can be distorted by too fast stretching, since they do not stretch uniformly as does the film.

Therefore, it will be seen from the above examples that by separating the necessary channels and providing one resin for the interlocking elements and another resin for the film structure, and by joining these at the die plate aperture, it is possible to obtain optimum physical characteristics for each without having to compromise one set of such characteristics with the other.

The provision for a separate channel to extrude special properties for the interlocking rib and groove elements can be incorporated into the die of FIG. 3 or may be used separately for other purposes apart from the implications of FIG. 3.

It will be suggested that various modifications may be suggested by the embodiments disclosed, but I desire to claim within the scope of the patent warranted hereon all such modifications as come within the scope of my invention.

I claim as my invention:

1. A sheet with a flexible closure comprising:

[a] web *portions* [portion] and [a] marginal *portions* [portion], said web *portions* [portion] being formed of a first thermoplastic substance having a given set of physical characteristics, said marginal portions having interlocking rib and groove elements *integral with said web portions* [portion] extending longitudinally thereon for providing a lock therebetween, said interlocking rib and groove elements being formed entirely of a separate second thermoplastic substance having a different set of physical characteristics from that of said first thermoplastic substance.

2. A sheet with a flexible closure comprising:

a pair of flexible closure strips each having a web portion and a marginal portion, said web *portions* [portion] being formed of a first thermoplastic substance having a given set of physical characteristics, said marginal portions having interlocking rib and groove elements *integral with said web portions* [portion] extending longitudinally thereon for providing a lock therebetween, said marginal portions extending above said rib and groove elements for providing a grip flange therewith, said grip flange having an inner face and an outer face, a first of said grip flanges having a spacer ridge formed integrally at the inner face thereof and being disposed longitudinally thereon, said spacer ridge being formed entirely of a separate second thermoplastic substance having a different set of physical characteristics from that of said first thermoplastic substance, a second of said grip flanges having an inner face contacting said spacer ridge and maintained thereby in spaced relation from said inner face of said first grip flange.

3. A container having a flexible closure including interlocking rib and groove elements comprising:

a pouch having front and back walls and a pouch opening at the upper edge thereof, said interlocking elements *integral with said walls and* disposed at the inner surface of said front and back walls for closing said pouch opening, said walls of said pouch being formed of a first thermoplastic substance having a given set of physical characteristics, said interlocking rib and groove elements being formed entirely of a separate second thermoplastic substance having a different set of physical characteristics from that of said first thermoplastic substance.

4. A container having a flexible closure including interlocking rib and groove elements comprising:

a pouch having front and back walls and a pouch opening at the upper edge thereof, said walls of said pouch being formed of a first thermoplastic substance having a given set of physical characteristics, said interlocking elements *integral with said walls and* disposed at the inner surface of said front and back walls for closing *said pouch opening and having spacer bead formed* above said interlocking elements for maintaining the upper edges of said front and back walls in spaced relation therewith, said spacer bead being formed entirely of a separate second thermoplastic substance having a different set of physical characteristics from that of said first thermoplastic substance.

5. A container having a flexible closure including interlocking rib and groove elements comprising:

a pouch having a front and back walls and a pouch opening at the upper edge thereof, said walls of said pouch being formed of a first thermoplastic substance having a given set of physical characteristics, said interlocking elements *integral with said walls and* disposed at the inner surface of said front and back walls for closing said pouch opening and having a spacer bead formed above said interlocking elements for maintaining the upper edges of said front and back walls in spaced relation therewith, said interlocking rib and groove elements being formed entirely of a separate second thermoplastic substance having a different set of physical characteristics from that of said first thermoplastic substance, said spacer bead being formed entirely of a separate second thermoplastic substance having a different set of physical characteristics from that of said first thermoplastic substance.

6. A sheet with an integral flexible closure comprising:

a pair of flexible closure strips each having a web portion and a marginal portion, said web and marginal portions being formed of a first thermoplastic substance having a given set of physical characteristics, said marginal portions having an inner face and an outer face thereof, interlocking rib and groove elements *integral with said web portions and* disposed at the inner faces of said marginal portions for being locked by pressure applied at the outer faces thereof, said marginal portions extending above said rib and groove elements for providing a grip flange therewith, said interlocking rib and groove elements being formed entirely of a separate second thermoplastic substance having a different set of physical characteristics from that of said *first* thermoplastic substance.

*7. A sheet with an integral flexible closure comprising:*

*a thermplastic film,*

*a raised shaped rib element with an enlarged head portion and being integral with said film and extending therealong,*

*a raised shaped groove element with a restricted opening being integral with film and extending therealong shaped to releasably interlockingly receive said rib element,*

*said film formed of a first thermoplastic,*

*said raised elements formed of a second thermoplastic,*

*said second thermoplastic having a greater rigidity than said first so that the film may form bag walls of a soft nature and said elements have a greater interlocking strength.*

*8. A sheet with an integral flexible closure comprising:*

*a thermoplastic film,*

*A raised shaped rib element with an enlarged head portion and being integral with said film and extending therealong,*

*a raised shaped groove element with a restricted opening being integral with film and extending therealong shaped to releasably interlockingly receive said rib element,*

*said film formed of a first thermoplastic,*

*said raised elements formed of a second thermoplastic,*

*said second thermoplastic having a greater slip factor than said first thermoplastic so that said elements interengage and release with facility and the film will form bag walls of less slippery nature.*

*9. A sheet with an integral flexible closure comprising:*

*a thermoplastic film,*

*a raised shaped rib element with an enlarged head portion and being integral with said film and extending therealong,*

*a raised shaped groove element with a restricted opening being integral with said film and extending therealong shaped to releasably interlockingly receive said rib element,*

*said film formed of a first thermoplastic,*

*said raised elements formed of a second thermoplastic,*

*said first thermoplastic being relatively transparent and soft for forming bag walls clear and pliable and said second thermoplastic being relatively stiff permitting said elements to have a high interlocking strength and be relatively small.*

*10. A sheet with an integral flexible closure comprising:*

*a thermoplastic film,*

*a raised shaped rib element with an enlarged head portion and being integral with said film and extending therealong,*

*a raised shaped groove element with a restricted opening being integral with film and extending therealong shaped to releasably interlockingly receive said rib element,*

*said film formed of a first thermoplastic,*

*said raised elements formed of a second thermoplastic,*

*said first thermoplastic having a high elongation factor relative to said second thermoplastic so that the film may stretch at a greater speed than the interlocking elements upon being formed and the interlocking elements tend to resist distortion as they stretch and are formed from an extruder.*

References Cited

The following references, cited by the Examiner, are of record in the patented file of this patent or the original patent.

UNITED STATES PATENTS

| | | | |
|---|---|---|---|
| 3,291,177 | 12/1966 | Naito | 150—3 |
| 2,772,469 | 12/1956 | Ateller | 24—204 |
| 2,780,261 | 2/1957 | Svec et al. | 150—3 |
| 2,789,609 | 4/1957 | Post | 150—3 |
| 2,823,721 | 2/1958 | Svec et al. | 150—3 |
| 3,172,443 | 3/1965 | Ausnit | 150—3 |
| 3,173,184 | 3/1965 | Ausnit | 24—201 |
| 3,198,228 | 8/1965 | Naito | 150—3 |
| 3,226,787 | 1/1966 | Ausnit | 24—201 |

FOREIGN PATENTS

| | | |
|---|---|---|
| 831,985 | 2/1952 | Germany. |
| 1,112,446 | 8/1961 | Germany. |

DONALD F. NORTON, Primary Examiner

U.S. Cl. X.R.

24—201C